United States Patent [19]

Lordi

[11] Patent Number: 4,469,843

[45] Date of Patent: Sep. 4, 1984

[54] MOLDING COMPOSITION COMPRISING MODIFIED STYRENE-MALEIC ANHYDRIDE COPOLYMER AND POLYCARBONATE

[75] Inventor: Frank E. Lordi, West Chester, Pa.

[73] Assignee: Atlantic Richfield Company, Los Angeles, Calif.

[21] Appl. No.: 379,700

[22] Filed: May 19, 1982

[51] Int. Cl.$^3$ ............................................. C08L 69/00
[52] U.S. Cl. ............................................. 525/67; 525/285
[58] Field of Search ............................. 525/67, 468, 285

[56] References Cited

U.S. PATENT DOCUMENTS

| | | | |
|---|---|---|---|
| 3,862,998 | 1/1975 | Koehler et al. | 525/147 |
| 3,919,354 | 11/1975 | Moore et al. | 525/245 |
| 3,966,842 | 6/1976 | Ludwig et al. | 525/148 |
| 4,351,920 | 9/1982 | Ariga et al. | 525/67 |

Primary Examiner—J. Ziegler
Attorney, Agent, or Firm—Dennis M. Kozak

[57] ABSTRACT

Thermoplastic molding compositions which comprise a rubber modified styrene-maleic anhydride non-equimolar copolymer and polycarbonate resin are disclosed.

19 Claims, No Drawings

MOLDING COMPOSITION COMPRISING MODIFIED STYRENE-MALEIC ANHYDRIDE COPOLYMER AND POLYCARBONATE

This invention relates to thermoplastic molding compositions.

More specifically, this invention relates to thermoplastic molding compositions which provide molded articles having excellent overall mechanical properties, particularly impact strength.

In one of its more specific aspects, this invention pertains to thermoplastic molding compositions which comprise a modified styrene-maleic anhydride copolymer and a polycarbonate resin.

Non-equimolar styrene-maleic anyhyride (SMA) copolymers and their uses are well known. Molding compositions containing a SMA copolymer and a polycarbonate resin are taught in U.S. Pat. No. 3,862,998. Rubber-modified SMA copolymers are taught in U.S. Pat. No. 3,919,354 and, the blending of a rubber-modified SMA copolymer with polycarbonate to produce molded articles exhibiting improved impact strength is taught in U.S. Pat. No. 3,966,842. More specifically, the latter patent teaches that a 30/70 weight percent blend of polycarbonate resin to rubber-reinforced SMA copolymer provides molded articles having maximum or peak impact strengths, and examples set forth in the patent illustrate that when the amount of polycarbonate in the blend is increased to 40 weight percent or more, there is a marked drop off in molded article impact strength.

It has now been found that by employing a unique combination of two materials to modify an SMA copolymer and by controlling the amount of maleic anhydride in the SMA copolymer, that the resulting modified nonequalmolar SMA copolymer when blended with polycarbonate resin will serve to provide molded articles having excellent impact strength. Moreover, the molded articles contain much higher levels of polycarbonate resin than the amount taught to be optimum by the prior art.

According to this invention there is provided a thermoplastic molding composition which comprises an intimate admixture of:

(a) the polymerization product of an $\alpha,\beta$-unsaturated cyclic anhydride, a vinyl aromatic monomer, a rubber and a vinyl aromatic monomer-conjugated diene copolymer; and, (b) polycarbonate resin.

In a preferred embodiment the $\alpha,\beta$-unsaturated cyclic anhydride is employed in an amount from about 3 to about 10.5 weight percent, preferably from about 3 to about 8 weight percent based on the total weight of the molding composition.

Any suitable $\alpha,\beta$-unsaturated cyclic anhydride can be employed. Suitable $\alpha,\beta$-unsaturated cyclic anhydrides are represented by the following general formula:

$$R^1—C(H)_n—\overset{R^2}{\underset{|}{C}}—(CH_2)_m—R^3,$$

wherein the dotted lines represent a single or a double carbon to carbon bond; $R^1$ and $R^2$ taken together represents a

linkage, $R^3$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-carbon double bond, and m is an integer from 0 to about 10.

Particularly suitable $\alpha,\beta$-unsaturated cyclic anhydrides include maleic anhydride, citraconic anhydride, itaconic anhydride, aconitic anhydride, mixtures thereof and the like.

Any suitable vinyl aromatic monomer can be employed. Suitable vinyl aromatic monomers include styrene, alpha-methyl styrene, nuclear methyl styrenes, ethyl styrene, isopropyl styrene, tert butyl styrene, chlorostyrenes, dichloro styrenes, vinyl napthalene, mixtures thereof and the like. A particularly suitable vinyl aromatic monomer is styrene.

As the rubber use can be made of any conjugated diene-styrenic copolymer containing 65 weight percent or more butadiene and/or isoprene. The balance of the copolymer will be a styrenic monomer as described in the preceeding paragraph. Homopolymers of butadiene and isoprene are also suitable for use.

Particularly suitable rubbers for use in the practice of this invention are the stereo specific copolymers of butadiene and styrene polymerized in a solution system using an aklyllithium catalyst. The copolymer rubbers designated Stereon ® Rubbers, have been found to be particularly suitable for use and are commercially available from Firestone Synthetic Rubber & Latex Company, Division of Firestone Tire & Rubber Company. Stereon ® Rubbers Nos. 700, 702, 720, 750 and 751 are all suitable for use and contain, respectively, 20, 20, 10, 18 and 25 weight percent bound styrene.

As the vinyl aromatic monomer-conjugated diene copolymer, use can be made of any copolymer containing from about 10 to about 60 weight percent conjugated diene. Preferably, the copolymer will contain from about 10 to about 35 weight percent conjugated diene. The balance of the copolymer will be a vinyl aromatic monomer, as previously described.

Particularly suitable vinyl aromatic monomer-conjugated diene copolymers are designated K-Resin ™ BDS Polymers (KR01, KR05 and KR03) commercially available from Phillips Chemical Company, A Division of Phillips Petroleum Company.

K-Resin ™ BDS Polymer is a mixed radial and linear teleblock copolymer containing about 75 weight percent styrene and about 25 weight percent butadene.

Any conventional method for the preparation of nonequimolar copolymers of vinyl aromatic compounds and dicarboxylic acid moieties can be employed to produce the modified SMA copolymers of this invention.

The above described materials are preferably polymerized by dissolving the $\alpha,\beta$-unsaturated anhydride, the rubber, and the vinyl monomer-conjugated diene copolymer in the vinyl aromatic monomer. The mixture is then fed, continuously, into a reactor where polymerization is initiated using a conventional free radical initiator such as, for example, a peroxide initiator, a thermal initiator or mixtures thereof. The resulting polymer solution is continuously removed from the reactor and devalatilized to remove unreacted monomer. This method of polymerization was employed to produce the polymers employed in the compositions of the invention set forth in the Example.

The final modified SMA product will comprise in weight percent from about 4 to about 17 α,β-unsaturated cyclic anhydride, from about 20 to about 88 vinyl aromatic monomer, from about 5 to about 25 rubber and from about 2 to about 20 vinyl aromatic monomer-conjugated diene copolymer.

Any suitable polycarbonate resin can be employed to produce the molding compositions of this invention. Suitable polycarbonate resins include those having a melt index within the range of from about 3 to about 24, melt flow condition o, as determined according to ASTM D-1238. Particularly suitable polycarbonate resins are designated Merlon ® polycarbonate resins and Lexan ® polycarbonate resins, commercially available from Mobay Chemical Corporation and General Electric Company, respectively.

The polymerization product described above and the polycarbonate resin are combinable in a wide range of proportions. The thermoplastic molding compositions of this invention can comprise, for instance, from about 20 to about 95 weight percent polycarbonate resin. Preferably, the thermoplastic molding composition will comprise from about 40 to about 75 weight percent polycarbonate resin. If the maleic anhydride in the polymerization product is employed in an amount within the upper end of the range as set forth above, that is, above about 13 weight percent, then the final thermoplastic molding composition will comprise at least about 40 weight percent polycarbonate such that the total maleic anhydride level in the composition is no greater than about 10.5 weight percent.

The molding compositions of the invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The molding compositions may be prepared using any suitable method of blending. Preferably, the compositions are prepared by melt mixing at a temperature above the softening points of the polymers using any conventional high shear melt mixing apparatus, including twin screw extruders, single screw extruders, equipped with high shear mixing sections, and the like. Thereafter, the extrudate is chopped into pellets and molded on conventional injection molding equipment.

The present invention further illustrated by the following examples, which are not to be construed as limiting. All parts are by weight.

EXAMPLE

This example demonstrates the preparation of four thermoplastic molding compositions of this invention (TABLE I) and sets forth a comparison between those compositions of the invention and those produced by the closest prior art, (U.S. Pat. No. 3,966,842), based on properties after molding (TABLE II).

In each instance (invention and prior art), the rubber modifier was present during the copolymerization of the styrene and maleic anhydride. In the four compositions of this invention the additional modifier—the vinyl aromatic monomer-conjugated diene copolymer (K-Resin ® BDS Polymer)—was also present during copolymerization. Each blend according to the invention had the following composition:

TABLE I

| Composition No. Material | I | II | III | IV |
|---|---|---|---|---|
| styrene | 33.5 | 34.5 | 31.8 | 30.2 |
| maleic anhydride | 6.5 | 4.0 | 6.2 | 5.8 |
| rubber (Stereon ® 720) | 7.5 | 8.5 | 7.1 | 6.7 |
| copolymer (K-Resin TM BDS Polymer-KR03) | 2.5 | 3.0 | 2.4 | 2.3 |
| polycarbonate (Merlon ® Resin M-39) | 50.0 | 50.0 | 52.5 | 55.0 |
| TOTAL | 100 | 100 | 100 | 100 |

Each modified SMA copolymer was polymerized by dissolving the total amounts of the rubber and the copolymer in the styrene, initiating polymerization and adding the maleic anhydride continuously to the polymerization mixture a rate sufficient to maintain the concentration of the anhydride low.

Each modified copolymer was then blended with the specified amount of polycarbonate resin by melt mixing at a melt temperature within the range of from about 520°–540° F. (the melt temperatures in °F. were 530, 540, 540 and 520, respectively) - using a twin screw Werner-Pfleiderer Model ZSK-53 extruder.

Each melt blend was subsequently molded into a ½"×⅛"×5" bar employing the following molding conditions:

| Barrel Heater Band Settings, °F. | |
|---|---|
| rear | 400 |
| center | 430 |
| front | 460 |
| nozzle | 460 |
| Mold Temperature, °F. | 120–125 |
| Screw Speed, rpm | 150 |
| First Stage Injection Pressure, psi | 1000 |
| Second Stage Injection Pressure, psi | 600 |
| Back Pressure, psi | 100 |
| Injection Speed Setting | 5.0 |
| First Stage Injection Time, sec. | 2.0 |
| Second Stage Injection Time, sec. | 8.0 |
| Cool Time, sec. | 10.0 |

All bars were then measured for impact strength according to ASTM D-256, at 73° F.

Impact data for each of the above four molding compositions of the invention and impact data reported for three comparative compositions of the closest prior art, are presented in following TABLE II.

TABLE II

| | INVENTION | | | | U.S. PAT. NO. 3,966,842 | | |
|---|---|---|---|---|---|---|---|
| | Composition No. | | | | Example No. | | |
| Material | I | II | III | IV | 5 | 6 | 7 |
| styrene | 33.5 | 34.5 | 31.8 | 30.2 | 45.6 | 39.1 | 32.6 |
| maleic anhydride | 6.5 | 4.0 | 6.2 | 5.8 | 11.7 | 10.0 | 8.4 |
| rubber | 7.5 | 8.5 | 7.1 | 6.8 | 12.7 | 11.9 | 9.0 |
| copolymer | 2.5 | 3.0 | 2.4 | 2.3 | 0 | 0 | 0 |
| polycarbonate | 50.0 | 50.0 | 52.5 | 55.0 | 30 | 40 | 50 |
| Property | | | | | | | |
| Impact Strength (ft-lbs./in.) | 10.9 | 15.2 | 13.5 | 14.5 | 12.8 | 7.9 | 9.8 |

It will be seen from the above data that the incorporation of the vinyl aromatic monomer-conjugated diene copolymer during polymerization of the SMA copolymer and the employment of lower amounts of maleic anhydride in the SMA copolymer serve to produce thermoplastic molded compositions having excellent impact strength. It will also be noted that this impact strength improvement is achieved when much more polycarbonate is employed in the molding composition than is taught to be optimum by the prior art. TABLE II illustrates that by incorporating 2.5 weight percent vinyl aromatic monomer-conjugated diene copolymer modifier and reducing the maleic anhydride 1.9 weight percent, that is, to 6.5, that the molding composition of this invention (see, Composition I) shows an impact strength increase of more than 11% as compared to the 50/50 prior art blend (see, Example 7). And, quite surprisingly, Composition II of the invention, which contains 3 weight percent vinyl aromatic monomer-conjugated diene copolymer and 4 weight percent maleic anhydride, shows a marked improvement of 55% over the 50/50 prior art blend.

It will be evident from the foregoing that various modification can be made to this invention. Such, however, are considered as being within the scope of the invention.

What is claimed is:

1. A thermoplastic molding composition comprising an intimate admixture of:
   (a) the polymerization product of an $\alpha,\beta$ unsaturated cyclic anhydride, a vinyl aromatic monomer, a rubber which is a conjugated diene-styrenic copolymer containing 65 weight percent or more conjugated diene, and a vinyl aromatic monomer-conjugated diene copolymer containing from about 10 to about 60 weight percent conjugated diene; and,
   (b) a polycarbonate resin.

2. The thermoplastic molding composition of claim 1 in which said $\alpha,\beta$ unsaturated cyclic anhydride is employed in an amount within the range of from about 3 to about 10.5 weight percent based on the total weight of the molding composition.

3. The thermoplastic molding composition of claim 1 in which said $\alpha,\beta$ unsaturated cyclic anhydride is employed in an amount within the range of from about 3 to about 8 weight percent based on the total weight of the molding composition.

4. The thermoplastic molding composition of claim 1 in which said vinyl aromatic monomer-conjugated diene copolymer contains from about 10 to about 35 weight percent conjugated diene.

5. The thermoplastic molding composition of claim 1 in which said polycarbonate resin is employed in an amount within the range of from about 20 to bout 95 weight percent.

6. The thermoplastic molding composition of claim 1 in which said polycarbonate resin is employed in an amount within the range of from about 40 to about 75 weight percent.

7. A thermoplastic molding composition comprising an intimate admixture of:
   (a) the polymerization product of maleic anhydride, styrene, a butadiene-styrene copolymer rubber containing 65 weight percent or more butadiene, and a styrene-butadiene copolymer containing from about 10 to about 60 weight percent butadiene; and
   (b) a polycarbonate resin.

8. The thermoplastic molding composition of claim 7 in which said polycarbonate resin is employed in an amount within the range of from about 20 to about 95 weight percent.

9. The thermoplastic molding composition of claim 7 in which said polycarbonate resin is employed in an amount within the range of from about 40 to about 75 weight percent.

10. The thermoplastic molding composition of claim 7 in which said polycarbonate resin is employed in an amount of about 50 weight percent.

11. The thermoplastic molding composition of claim 7 in which said polycarbonate resin is employed in an amount of about 52.5 weight percent.

12. The thermoplastic molding composition of claim 9 in which said polycarbonate resin is employed in an amount of about 55 weight percent.

13. A thermoplastic molding composition comprising an initmate admixture of:
   (a) from about 60 to about 5 weight percent of the polymerization product of maleic anhydride, styrene, a butadiene-styrene copolymer rubber containing about 90 weight percent butadiene, and a styrene-butadiene copolymer containing about 75 weight percent styrene; and
   (b) from about 40 to about 95 weight percent polycarbonate resin.

14. The thermoplastic molding composition of claim 13 comprising from about 60 to about 25 weight percent of the polymerization product and from about 40 to about 75 weight percent of the polycarbonate resin.

15. A thermoplastic resin composition comprising:
   (a) from about 20 to about 95 weight % of a polymerization product of an $\alpha\beta$-unsaturated cyclic anhydride, a vinyl aromatic monomer, a rubber which is a conjugated diene-styrenic copolymer containing 65 weight percent or more conjugated diene containing from about 10 to about 60 weight percent conjugated diene and a vinyl aromatic monomer conjugated diene copolymer and (b) from about 80 to 5 weight % of a polycarbonate resin as main components 16. The composition of claim 15 wherein said polymerization product (a) is prepared by dissolving an $\alpha\beta$-unsaturated anhydride, the rubber, and the vinyl aromatic monomer-conjugated diene copolymer in the vinyl aromatic monomer and then polymerizing resulting mixture.

17. The composition of claim 15 wherein said polycarbonate resin (b) is obtained by reacting an aromatic dihydroxyl compound with phosgene.

18. The composition of claim 17 wherein said aromatic dihydroxy compound is a bis(hydroxyaryl) alkane.

19. The composition of claim 17 wherein said aromatic dihydroxy compound is 2,2-bis-(4-hydroxyphenyl) propane.

* * * * *